US012037220B1

(12) United States Patent
Smith et al.

(10) Patent No.: US 12,037,220 B1
(45) Date of Patent: Jul. 16, 2024

(54) SYSTEMS FOR MONITORING SMOKE AND HEAT IN ELEVATOR HOISTWAYS

(71) Applicant: The ADT Security Corporation, Boca Raton, FL (US)

(72) Inventors: Martin Smith, Cooksville, MD (US); Ryan Sandler, Santee, CA (US); Jeffrey Smith, Severn, MD (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/356,943

(22) Filed: Jul. 21, 2023

(51) Int. Cl.
*B66B 5/02* (2006.01)

(52) U.S. Cl.
CPC .................................... *B66B 5/024* (2013.01)

(58) Field of Classification Search
CPC ...................................................... B66B 5/024
See application file for complete search history.

(56) References Cited

U.S. PATENT DOCUMENTS 5,708,218 A * 1/1998 Jax .......................... G01M 3/04 73/864.34
8,629,780 B2 * 1/2014 Goulet ................. G08B 17/113 340/584
9,208,671 B2 * 12/2015 Susel ..................... G08B 29/16
11,002,579 B2 * 5/2021 Ajay ......................... G01F 1/66
11,244,551 B2 * 2/2022 Escofet Via ........... G08B 17/06
2012/0319853 A1 * 12/2012 Goulet .................. G08B 17/10 73/196
2015/0161865 A1 * 6/2015 Susel ..................... G08B 29/16 340/628
2020/0055698 A1 * 2/2020 Gireddy ................ B66B 13/143
2020/0109976 A1 * 4/2020 Ajay ........................ G01N 1/26
2021/0192913 A1 * 6/2021 Escofet Via ........... G08B 17/10
2021/0331893 A1 * 10/2021 Thum ................. B66B 11/0005
2022/0063957 A1 * 3/2022 Toutaoui ................ B66B 5/027

FOREIGN PATENT DOCUMENTS

WO WO-2023235344 A1 * 12/2023

OTHER PUBLICATIONS

Lift/Elevator Shaft Application Note; xtralis; Doc. No. 19109_04; Jun. 2020, consisting of 9-pages.
Linear Heat Detection Cable; Data Sheet; Fike Corporation; Sep. 2010, consisting of 5-pages.

* cited by examiner

*Primary Examiner* — Michael A Riegelman
(74) *Attorney, Agent, or Firm* — Weisberg I.P. Law, P.A.

(57) ABSTRACT

An integrated monitoring panel for an elevator hoistway fire detection system is provided. The system includes a power supply, fault indicators for power and smoke detection, and alarm indicators for smoke and linear heat detection. The panel is configured to receive a terminus of a linear heat detection cable and a terminus of a smoke alarm detection piping. The panel includes a smoke detection test port that may receive simulated smoke and is connected to another terminus of the smoke alarm detection piping. A linear heat detection test switch triggers a test mode and interacts with the linear heat detection cable. During the test mode, the system circulates simulated smoke, analyzes air quality and electrical conditions, and activates corresponding alarm indicators. The performance of these functionalities helps determine whether the system meets operational criteria.

20 Claims, 6 Drawing Sheets

SYSTEMS FOR MONITORING SMOKE AND HEAT IN ELEVATOR HOISTWAYS

TECHNICAL FIELD

The present disclosure is generally related to systems for monitoring smoke and heat in elevator hoistways.

BACKGROUND

Fire alarm initiating devices are typically required to be installed inside an elevator hoistway (also referred to as an elevator shaft). Historically, fire alarm service personnel must ride an elevator or lean into an open door of the elevator hoistway to perform routine inspection, testing, and maintenance tasks, which are often dangerous tasks for such personnel. Safety standards organizations have considered implementing access from outside the elevator hoistway for improving the safety of these inspection, testing, and maintenance tasks.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. The terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. Multiple components may interoperate and modifications and variations are possible to achieve the electrical and data communication.

In some embodiments described herein, the term "coupled," "connected," and the like, may be used herein to indicate a connection, although not necessarily directly, and may include wired and/or wireless connections.

Figure 1:
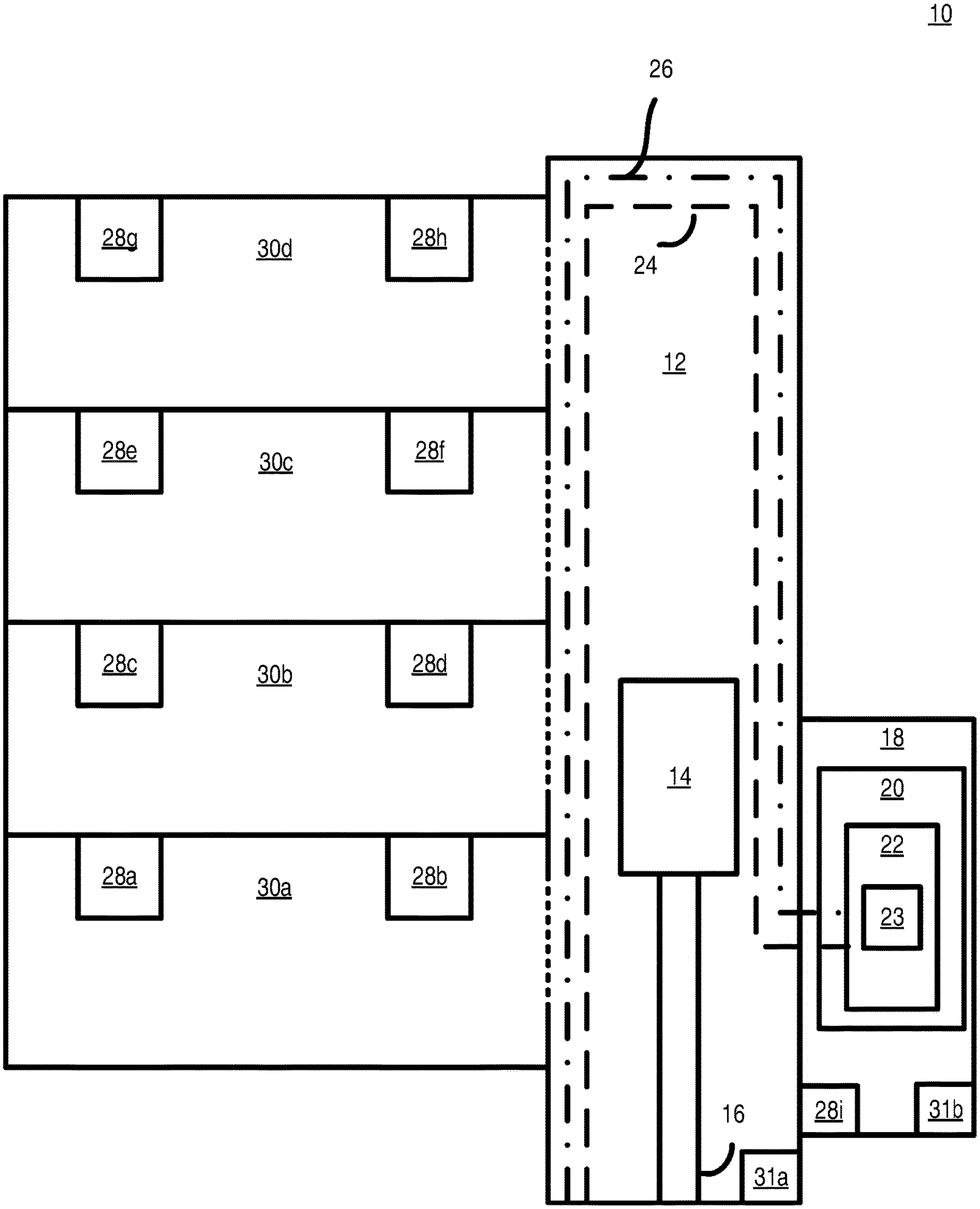
FIG. 1 is a diagram of an example system comprising an elevator hoistway monitoring system, according to some embodiments of the present disclosure.

Referring now to the drawing figures in which like reference designators refer to like elements there is shown in FIG. 1 a system designated generally as "10." System 10 may include an elevator hoistway 12 including an elevator 14. In this example, elevator 14 is a hydraulic style elevator, which is supported by hydraulic system 16. Elevator hoistway 12 is adjacent to elevator machine room 18, which may be located on or near a ground level of the elevator hoistway 12, which includes an integrated monitoring panel 20 including a monitoring device 22 which includes monitoring unit 23 (as further described with respect to FIGS. 3-4). Monitoring device 22 is coupled to a smoke alarm detection piping 24 and to a linear heat detection cable 26. Each of the smoke alarm detection piping 24 and a linear heat detection cable 26 are disposed within the elevator hoistway 12, and may be disposed along and/or upon at least a portion of the sidewalls, floor, and/or ceiling of elevator hoistway 12. Further, each of the smoke alarm detection piping 24 and a linear heat detection cable 26 may traverse a wall separating the elevator machine room 18 from the elevator hoistway 12, e.g., via one or more apertures, which may include firestopping to prevent fires from spreading from the elevator hoistway 12 to the elevator machine room 18 or vice-versa. The system 10 may further include detectors 28*a*-*h*, disposed within respective floors 30*a*-30*d* of a building or structure, and detector 28*i*, disposed within elevator machine room 18. Detectors 28*a*-*i* may correspond to one or more of smoke detectors and/or heat detectors. System 10 may further include sprinkler 31*a* disposed within the elevator hoistway 12 and sprinkler 31*b* disposed within the elevator machine room 18.

Figure 2:
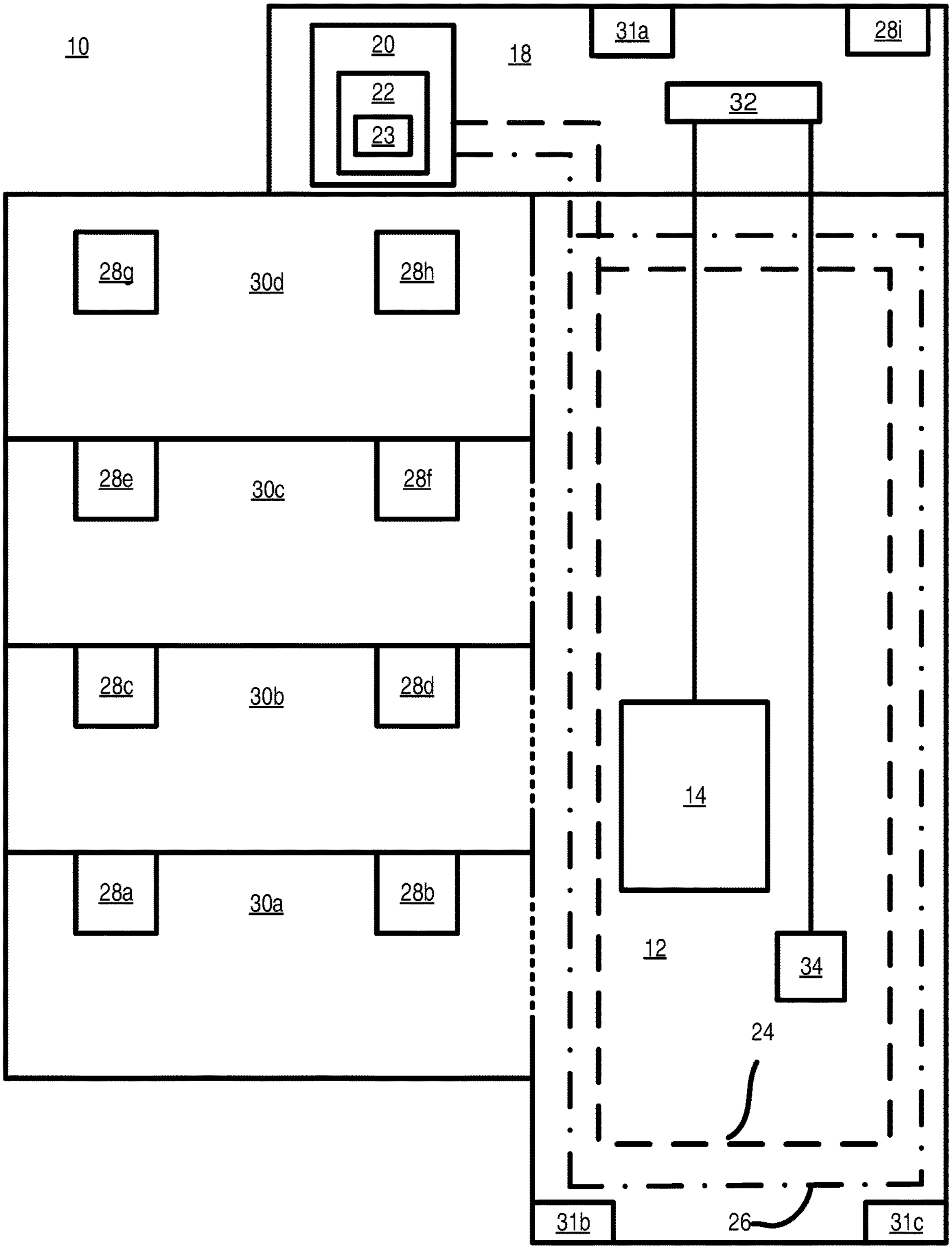
FIG. 2 is a diagram of another example system comprising an elevator hoistway monitoring system, according to some embodiments of the present disclosure.

FIG. 2 illustrates another example embodiment of system 10 similar to the system 10 of FIG. 1, wherein the elevator 14 is a traction system elevator, which is supported by traction system 32, which may be coupled to the elevator 14 and a counterweight 34. In this embodiment, the elevator machine room 18 may be located at or near the top or ceiling of the elevator hoistway 12. As with system 10 of FIG. 1, system 10 of FIG. 2 may include an integrated monitoring panel 20 located in elevator machine room 18 which includes monitoring device 22*a* and monitoring device 22*b* (collectively referred to as monitoring device 22) that respectively comprise monitoring unit 23*a* and monitoring unit 23*b* (collectively referred to as monitoring unit 23). In one or more embodiments, monitoring device 22*a* is a smoke monitoring device 22*a* and monitoring unit 23*a* is a smoke monitoring unit 23*a*. In one or more embodiments, monitoring device 22*b* is a linear heat monitoring device 22*b* and monitoring unit 23*b* is a linear heat monitoring unit 23*b*. Monitoring device 22*a* is coupled to a smoke alarm detection piping 24 and monitoring device 22*b* is coupled to a linear heat detection cable 26. Each of the smoke alarm detection piping 24 and a linear heat detection cable 26 are disposed within the elevator hoistway 12, and may be disposed along and/or upon at least a portion of the sidewalls, floor, and/or ceiling of elevator hoistway 12. Further, each of the smoke alarm detection piping 24 and a linear heat detection cable 26 may traverse a wall separating the elevator machine room 18 from the elevator hoistway 12, e.g., via one or more apertures. The system 10 may further include detectors 28*a-h*, disposed within respective floors 30*a*-30*d* of a building or structure, and detector 28*i*, disposed within elevator machine room 18. Detectors 28*a-i* may correspond to one or more of smoke detectors and/or heat detectors. System 10 may further include sprinkler 31*a* disposed within the elevator hoistway 12 and sprinkler 31*b* disposed within the elevator machine room 18.

The smoke alarm detection piping 24 may include a plurality of sampling ports disposed at various points throughout the elevator hoistway 12 and/or elevator machine room 18 and/or floors 30*a-d*, enabling the smoke alarm detection piping 24 to receive air samples from the elevator hoistway 12 and/or elevator machine room 18 and/or floors 30*a-d*. For example, when the elevator hoistway 12 fills with smoke due to a fire condition in the elevator hoistway 12 and/or any of floors 30*a-d*, the smoke is received by the one or more sampling ports. The monitoring device 22*a* may be configured to verify that negative pressure is being applied to the smoke alarm detection piping 24, such that the air and/or smoke is pulled into the smoke alarm detection piping 24 and ultimately received and sampled by integrated monitoring panel 20 or monitoring device 22. For example, the verification may comprise determining that one or more fans associated with the smoke alarm detection piping 24 are operating.

The linear heat detection cable 26 may be formed of any suitable material(s) enabling it to detect a high heat condition, e.g., corresponding to a fire or other dangerous to life and safety condition in elevator hoistway 12 and/or elevator machine room 18 and/or floors 30*a-d*. For example, in some embodiments, the linear heat detection cable 26 may be formed by a cable comprising two inner wires, each of the inner wires being a spring steel conductor or similar suitable material, and each of the inner wires being coated by a suitable material, such as a zinc coating or a copper coating, and a heat sensitive polymer. The heat sensitive polymer may be further coated by a polymer tape, with an outer jacket wrapping the cable. Other configurations and/or materials may be used for the linear heat detection cable 26.

Figure 3:
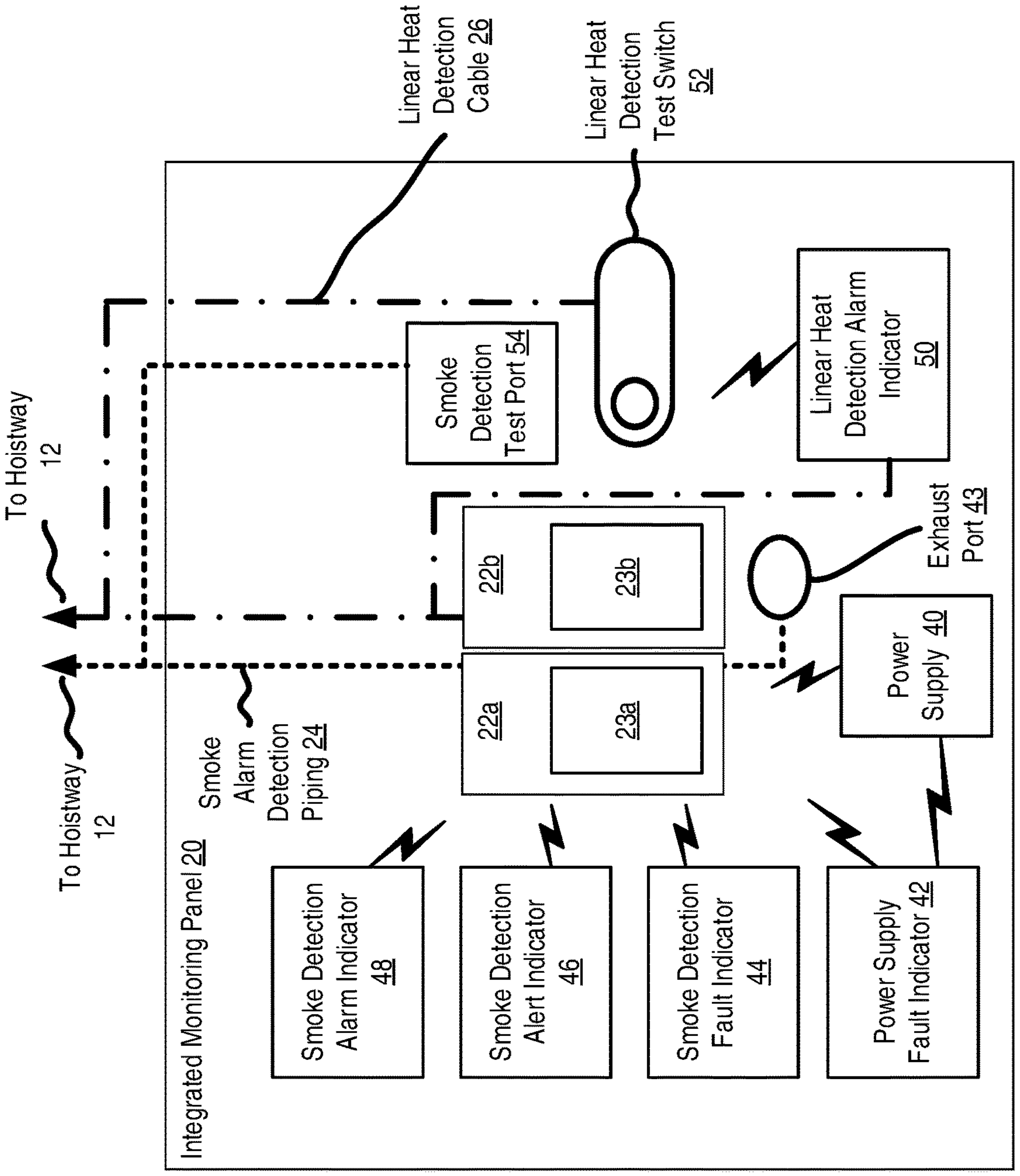
FIG. 3 is a diagram illustrating an example integrated monitoring panel, according to some embodiments of the present disclosure.

FIG. 3 illustrates an example integrated monitoring panel 20 according to some embodiments of the present disclosure. Integrated monitoring panel 20 comprises monitoring device 22 (i.e., monitoring devices 22*a-b*), including monitoring unit 23 (i.e., monitoring units 23*a-b*). Integrated monitoring panel 20 may further comprise one or more of power supply 40, a power supply fault indicator 42, an exhaust port 43, a smoke detection fault indicator 44, a smoke detection alert indicator 46, a smoke detection alarm indicator 48, a linear heat detection alarm indicator 50, a linear heat detection test switch 52, and a smoke detection test port 54. The integrated monitoring panel 20 may further be configured to receive the smoke alarm detection piping 24 and/or the linear heat detection cable 26. For example, a portion and/or terminus of the smoke alarm detection piping 24 and/or the linear heat detection cable 26 may be affixable to the integrated monitoring panel 20 and may connect to the monitoring device 22. Further, a portion and/or terminus of the smoke alarm detection piping 24 may connect to the smoke detection test port 54 and/or exhaust port 43. Further, a portion and/or terminus of the linear heat detection cable 26 may connect to the linear heat detection test switch 52 and/or the linear heat detection alarm indicator 50.

In some embodiments, integrated monitoring panel 20 may be comprised of a steel material, a plastic material, or other suitable material(s), upon which one or more of the monitoring device 22, power supply 40, power supply fault indicator 42, exhaust port 43, exhaust port 43, smoke detection fault indicator 44, smoke detection alert indicator 46, smoke detection alarm indicator 48, linear heat detection alarm indicator 50, linear heat detection test switch 52, and smoke detection test port 54 may be affixed.

For example, integrated monitoring panel 20 may be comprised of a stainless steel material, such as an 18 gauge and/or #4 backplate, which may include prefabricated mounting holes for the various components which are to be affixed to the integrated monitoring panel 20, enabling a streamlined installation. For example, the various components (e.g., monitoring device 22, power supply 40, etc.) may be affixed to the integrated monitoring panel 20 in a factory setting prior to installation in elevator machine room 18, thereby reducing time and labor costs necessary for installation of system 10.

In one or more embodiments, integrated monitoring panel 20 and/or monitoring device 22 may provide one or more of management functions, monitoring functions, analysis functions, control functions such as alarm management, alert management, smoke sensing, air sampling, and heat sensing, among other functions related to monitoring system 10.

integrated monitoring panel 20 and/or monitoring device 22 may communicate with one or more other entities of system 10 via one or more communication links. In particular, the communications links may be broadband communication links, such as a wired cable modem or Ethernet communication link, and a digital cellular communication link, such as a long term evolution (LTE), 5G and/or 6G based link, among other broadband communication links. A broadband link in various embodiments may be a communication link other than a plain old telephone service (POTS) line. An Ethernet communication link may be an IEEE 802.3 or 802.11 based communication link.

In one or more embodiments, monitoring device 22 may comprise a monitoring unit 23 configured for analyzing sensor data collected at and/or generated by the monitoring device 22 or other entities of system 10, and for generating appropriate alerts and/or alarms in response to one or more detected conditions. For example, monitoring device 22*a* may comprise monitoring unit 23*a* configured for analyzing sensor data associated with smoke detection, and for generating appropriate alerts and/or alarms in response to one or more detected conditions. Also, monitoring device 22*b* may comprise a monitoring unit 23*b* configured for analyzing sensor data associated with linear heat detection, and for generating appropriate alerts and/or alarms in response to one or more detected conditions.

Power supply 40 may be any device or entity configured for supplying power to the monitoring device 22 and/or any other component of integrated monitoring panel 20. In one or more embodiments, power supply 40 may include a battery backup for supplying power in the event of a power failure.

Power supply fault indicator 42 may include a light-based indicator and/or audio-based indicator for alerting an operator regarding a fault or failure with power supply 40.

Exhaust port 43 may be configured for providing an aperture for releasing or discharging fluid such as smoke or gas pent up in smoke alarm detection piping 24, e.g., to prevent a buildup of pressure in the smoke alarm detection piping 24. Further, exhaust port 43 may be configured to release and/or discharge fluid (e.g., non-smoke air) drawn into smoke alarm detection piping 24.

Monitoring device 22 may be configured to communicate with one or more of the smoke detection fault indicator 44, smoke detection alert indicator 46, smoke detection alarm indicator 48, linear heat detection alarm indicator 50, linear heat detection test switch 52, and/or any other entity of system 10 and/or integrated monitoring panel 20.

For example, smoke detection fault indicator 44 may include a light-based indicator and/or audio-based indicator for alerting an operator regarding a fault or failure with smoke detection functionality in monitoring device 22. Further, in one or more embodiments, smoke detection fault indicator 44 may indicate a problem such as low airflow.

Smoke detection alert indicator 46 may include a light-based indicator and/or audio-based indicator for alerting an operator regarding an alert (e.g., a supervisory alert) generated by smoke detection functionality in monitoring device 22 (e.g., monitoring device 22*a*).

Smoke detection alarm indicator 48 may include a light-based indicator and/or audio-based indicator for alerting an operator regarding an alarm generated by smoke detection functionality in monitoring device 22 (e.g., monitoring device 22*a*).

Linear heat detection alarm indicator 50 may include a light-based indicator and/or audio-based indicator for alerting an operator regarding an alarm generated by linear heat detection functionality in monitoring device 22 (e.g., monitoring device 22*b*).

In one or more embodiments, linear heat detection test switch 52 may be configured to provide a user interface for enabling an operator to activate a test mode for monitoring device 22 (e.g., monitoring device 22*b*) and/or linear heat detection cable 26. For example, when activated, the linear heat detection test switch 52 and/or monitoring device 22 may generate a voltage and/or heat condition which causes the linear heat detection test switch 52 and/or monitoring device 22 to simulate a heat event, such as a fire in the elevator hoistway 12, enabling the operator to test the heat detection functionality of the linear heat detection cable 26 and/or monitoring device 22.

Smoke detection test port 54 may include a terminus, aperture, and/or port for enabling an operator to input smoke (e.g., simulated smoke, actual smoke, or similar gaseous input) into the smoke alarm detection piping 24, enabling the operator to test the functionality of smoke alarm detection piping 24 and/or monitoring device 22 (e.g., monitoring device 22*a*).

In some embodiments, monitoring device 22 may be further configured to receive sensor information/alerts/alarms, e.g., via a wired and/or wireless connection, from one or more of detectors 28*a-i* (collectively, detectors 28).

In some embodiments, monitoring device 22 may be further configured to communicate with cause sprinklers 31*a-c* e.g., via a wired and/or wireless connection, and may be further configured to initiate a process for the activation of the sprinklers 31*a-c*, e.g., initiate the process based on smoke conditions detected in system 10 where the process may include, for example, verification of an event, moving the elevator to a predefined position in the hoistway, turning off power to the elevator and/or one or more devices in elevator machine room 18. That is, in one or more embodiments, sprinklers 31*a-c* are not directly activated by monitoring device 22 but the smoke or fire detections may be used as inputs in a process that may activate sprinklers 31*a-c*.

In some embodiments, at least a portion of the linear heat detection cable 26 may be disposed/installed within a short distance (e.g., 24 inches) of one or more sprinklers 31*a-c* (collectively, sprinklers 31), such as a sprinkler 31*a* at the top of the elevator hoistway 12.

Figure 4:
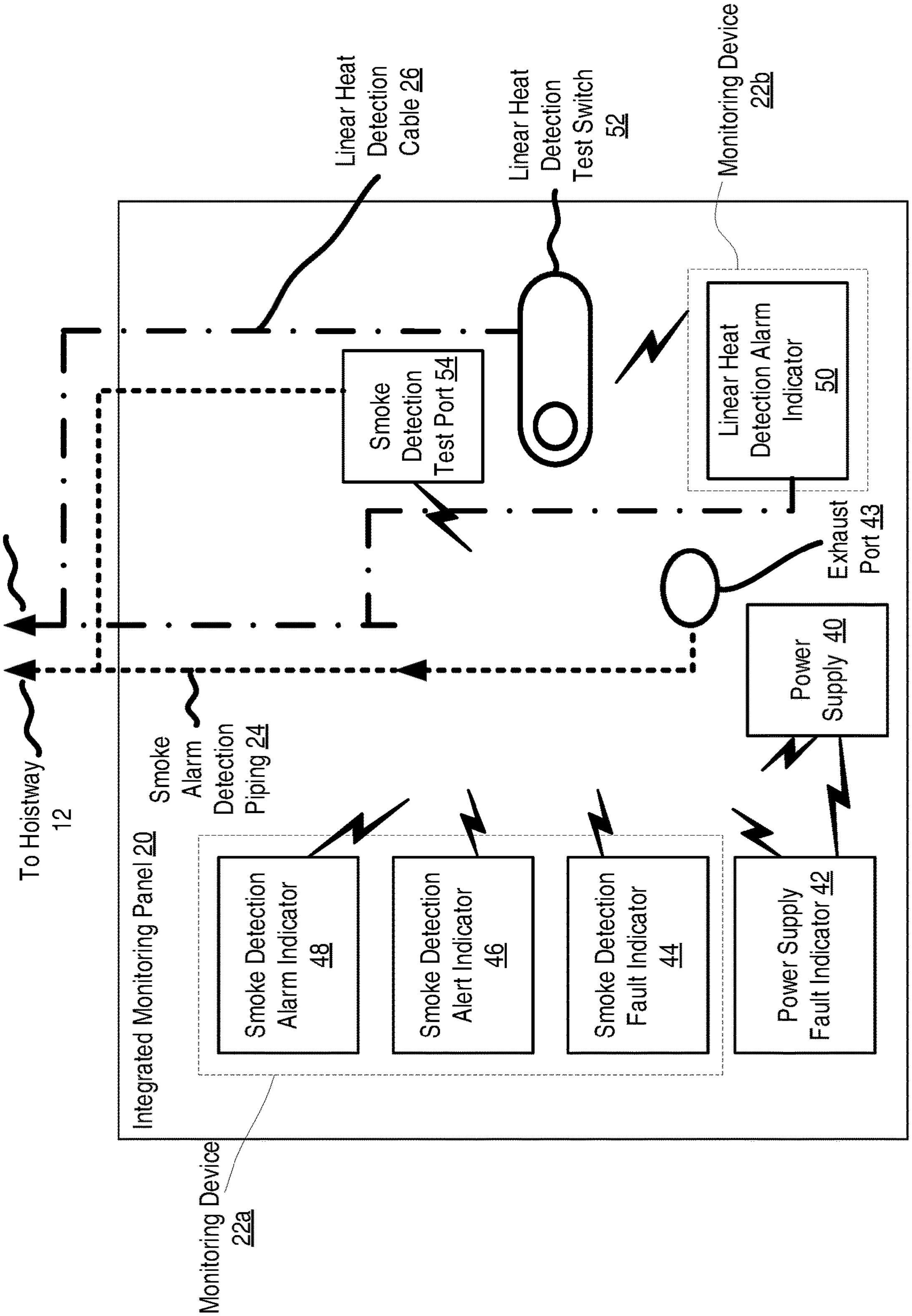
FIG. 4 is a diagram illustrating another example integrated monitoring panel, according to some embodiments of the present disclosure.

FIG. 4 illustrates another example of integrated monitoring panel 20 according to some embodiments of the present disclosure. Integrated monitoring panel 20 of FIG. 4 substantially corresponds to integrated monitoring panel 20 of FIG. 3 except that monitoring device 22*a* comprises one or more modules or elements such as smoke detection alarm indicator 48, smoke detection alert indicator 46, and smoke detection fault indicator 44, and monitoring device 22*b* comprises one or more modules or elements such as linear heat detection alarm indicator 50 that is in communication with linear heat detection test switch 52. In one or more embodiments, monitoring device 22*a* may optionally include power supply fault indicator 42.

Figure 5:
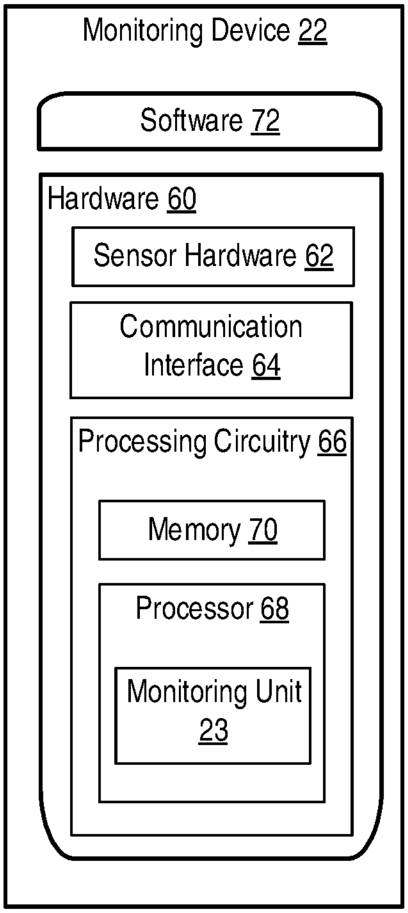
FIG. 5 is a diagram illustrating an example monitoring device, according to some embodiments of the present disclosure.

In one or more embodiments, one or more modules or elements of monitoring device 22*a* and/or monitoring device 22*b* may comprise respective software and/or hardware described in detail with respect to FIG. 5. In one or more embodiments, monitoring device 22 may refer to a grouping of specific elements or modules.

Example implementations, in accordance with embodiments of system 10 discussed in the preceding paragraphs will now be described with reference to FIG. 5.

Monitoring device 22 comprises hardware 60. The hardware 60 may include sensor hardware 62, communication interface 64, and processing circuitry 66. The processing circuitry 66 may include one or more processors 68 and one or more memories 70. Each processor 68 may include and/or be associated with one or more central processing units, data buses, buffers, and interfaces to facilitate operation. In addition to or instead of a processor 68 and memory 70, the processing circuitry 66 may comprise integrated circuitry for processing and/or control. Integrated circuitry may include one or more processors and/or processor cores, field programmable gate arrays (FPGAs), and/or application specific integrated circuits (ASICs), graphics processing units (GPUs), Systems on Chips (SoCs), configured to execute instructions. The processor 68 may be configured to access (e.g., write to and/or read from) the memory 70, which may comprise any kind of volatile and/or nonvolatile memory, e.g., cache, buffer memory, random access memory (RAM), read-only memory (ROM), optical memory, and/or erasable programmable read-only memory (EPROM). Further, memory 70 may be configured as a storage device. The processing circuitry 66 may be configured to perform various functionality described herein. For example, computer instructions may be stored in memory 70 and/or another computer-readable medium that, when executed by the processor 68, cause the processor 68 to perform various functionalities.

Hardware 60 of monitoring device 22 may include sensor hardware 62, such as one or more smoke detectors, heat detectors, voltage detectors, current detectors, temperature detectors, air quality detectors, chemical/gas detectors, etc. In one or more embodiments, sensor hardware 62 is configured to receive and analyze the air/gas/smoke/etc. received in monitoring device 22 via smoke alarm detection piping 24. In one or more embodiments, sensor hardware 62 is configured to receive and analyze the heat/temperature/voltage/current/resistance/etc. received in monitoring device 22 via linear heat detection cable 26. In some embodiments, sensor hardware 62 may generate sensor data, which may be further analyzed by monitoring unit 23.

Hardware 60 may include communication interface 64 enabling monitoring device 22 to communicate with any component or device of system 10. For example, communication interface 64 may be configured for establishing and maintaining at least a wireless or wired connection with any component or device of system 10. The communication interface 64 may be formed as or may include, for example, one or more radio frequency (RF) transmitters, one or more RF receivers, and/or one or more RF transceivers.

Monitoring device 22 further has software 72 (which may include one or more software applications) stored internally in, for example, memory 70, or stored in external memory (e.g., database, storage array, network storage device, etc.) accessible by the monitoring device 22 via an external connection. Software 72 may include any software or program configured to perform the steps or processes of the present disclosure, e.g., causing monitoring unit 23 to analyze sensor data captured by sensor hardware 62, and/or to transmit such data and/or resulting alerts/alarms/indications/etc. to one or more elements of system 10 and/or integrated monitoring panel 20.

The processing circuitry 66 may be configured to control any of methods and/or processes described herein and/or to cause such methods, and/or processes to be performed, e.g., by monitoring device 22. Processor 68 corresponds to one or more processors 68 for performing monitoring device 22 functions described herein. The memory 70 is configured to store data and/or files such as premises system data and/or other information/data. In some embodiments, the software 72 may include instructions that, when executed by the processor 68 and/or processing circuitry 66, causes the processor 68 and/or processing circuitry 66 to perform the processes described herein with respect to monitoring device 22. For example, processing circuitry 66 of monitoring device 22 may include monitoring unit 23, which may be configured to perform any of the processes, steps, or functions described herein, e.g., analyzing sensor data captured by sensor hardware 62, determining one or more alerts/alarms/faults/etc. based on the sensor data, and/or to transmitting such data and/or indications of such alerts/alarms/faults/etc. to one or more elements of system 10. As another example, monitoring device 22 and/or monitoring unit 23 may be configured to cause elevator 14 to enter an emergency mode of operation and/or cease operating, for example, by causing elevator 14 to move to a preset floor 30*a*. Accordingly, by having computer instructions stored in memory 70 accessible to the processor 68, the processor 68 may be configured to perform the actions described herein In some embodiments, at least a portion of the linear heat detection cable 26 may be installed alongside at least a portion of the smoke alarm detection piping 24. At least a portion of the linear heat detection cable 26 may be secured to at least a portion of the smoke alarm detection piping 24 using one or more mounting clips, pipe mounting straps, or other suitable components.

Figure 6:
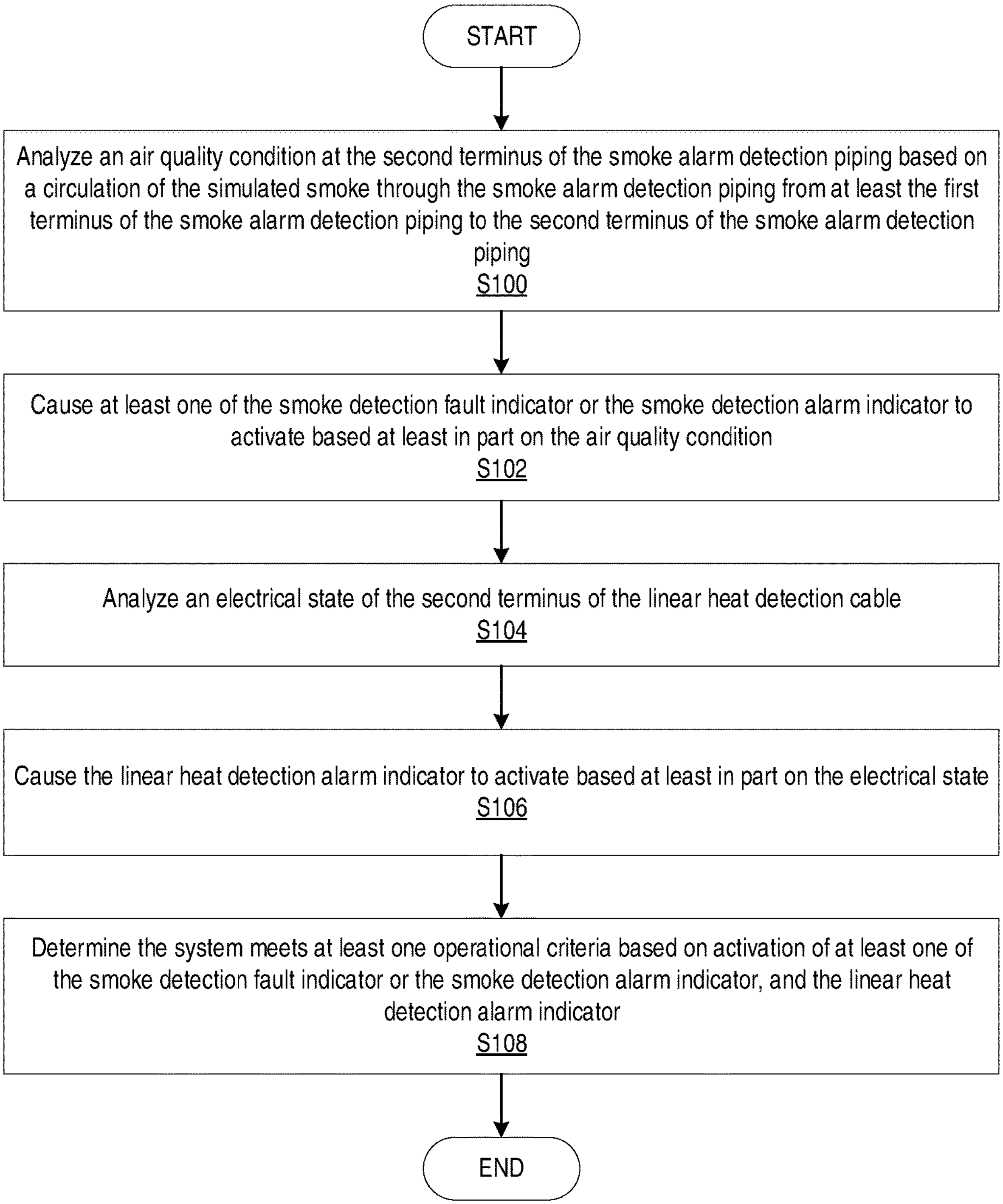
FIG. 6 is a flowchart of an example process performed in the elevator hoistway monitoring system of FIG. 1 or FIG. 2.

FIG. 6 is a flowchart of an example process of system 10 for detecting conditions in an elevator hoistway 12, according to some embodiments of the present disclosure. One or more blocks described herein may be performed by one or more elements of integrated monitoring panel 20, such as by one or more of processing circuitry 66, monitoring unit 23, sensor hardware 62, and/or communication interface 64, power supply 40, power supply fault indicator 42, smoke detection fault indicator 44, smoke detection alert indicator 46 and/or smoke detection alarm indicator 48, linear heat detection alarm indicator 50, linear heat detection test switch 52, smoke detection test port 54, smoke alarm detection piping 24, and/or linear heat detection cable 26.

The system 10 may comprise smoke alarm detection piping 24, where at least a portion of the smoke alarm detection piping 24 is disposed within the elevator hoistway 12. The system 10 may further comprise a linear heat detection cable 26, where at least a portion of the linear heat detection cable 26 is disposed within the elevator hoistway 12 and affixed to at least a portion of the smoke alarm detection piping 24 via a plurality of mounting clips. The system 10 may further include an integrated monitoring panel 20 disposed in an elevator machine room 18, where the integrated monitoring panel 20 comprises a test mode, a power supply 40 configured to supply power, a power supply fault indicator 42 configured to monitor the power supply for a power supply fault (and, optionally, provide a light and/or audio indicator in response to detecting a power supply fault), a smoke detection fault indicator 44, a smoke detection alert indicator 46, a smoke detection alarm indicator 48, a smoke detection test port 54 in fluid communication with the smoke alarm detection piping 24, where the smoke detection test port 54 is configured to receive simulated smoke (and/or "real" smoke or other gaseous compounds which may be used for testing the system), where the smoke alarm detection piping 24 comprises a first terminus connected to the smoke detection test port 54 and a second terminus connected to the integrated monitoring panel 20, a linear heat detection alarm indicator 50, a linear heat detection test switch 52 configured to trigger testing of the linear heat detection cable (e.g., based on a user flipping a switch, receiving a wired or wireless test initiation signal, or some other input, condition, state, etc.), where the linear heat detection cable 26 comprises a first terminus in electrical communication with the linear heat detection test switch 52 and a second terminus connected to the monitoring device 22, an exhaust port 43 configured to discharge fluid (e.g., non-smoke containing air, smoke, etc.) in the smoke alarm detection piping 24.

The linear heat detection test switch 52 may be configured to apply an electrical condition to the first terminus of the linear heat detection cable 26 based at least in part on the triggering of testing of the linear heat detection cable (e.g., by monitoring device 22 and/or by a user input, received signaling, etc.). In one or more embodiments, the simulated smoke is circulated by a fan and/or other means for circulating air through the smoke alarm detection piping 24 from at least the first terminus of the smoke alarm detection piping 24 to the second terminus of the smoke alarm detection piping 24. For example, a fan may be configured to remain operating irrespective of test mode activation or deactivation such that the fan draws negative pressure throughout the smoke alarm detection piping 24 to cause fluid (e.g., non-smoke air, smoke, etc.) to be drawn in and sampled for the presence of smoke.

Integrated monitoring panel 20 is configured to, during test mode, analyze (Block S100) an air quality condition at the second terminus of the smoke alarm detection piping 24 based on a circulation of the simulated smoke through the smoke alarm detection piping 24 from at least the first terminus of the smoke alarm detection piping 24 to the second terminus of the smoke alarm detection piping 24, cause at least one of the smoke detection alert indicator 46 or the smoke detection alarm indicator 48 to activate (Block S102) based at least in part on the air quality condition, analyze (Block S104) an electrical state of the second terminus of the linear heat detection cable 26, cause the linear heat detection alarm indicator 50 to activate (Block S106) based at least in part on the electrical state, and determine (Block S108) the system 10 meets at least one operational criteria based on activation of the smoke detection alert indicator 46 or the smoke detection alarm indicator 48, and/or the linear heat detection alarm indicator 50.

In some embodiments, the integrated monitoring panel 20 is configured to receive at least one of heat detection information and smoke detection information from at least one detector 28 external to the integrated monitoring panel.

In some embodiments, the integrated monitoring panel 20 is disposed within an elevator machine room 18.

In some embodiments, the smoke alarm detection piping 24 traverses a firestopped barrier between the elevator machine room 18 and the elevator hoistway 12.

In some embodiments, the linear heat detection cable traverses a firestopped barrier between the elevator machine room 18 and the elevator hoistway 12

In some embodiments, the integrated monitoring panel 20 is further configured to trigger an elevator 14 in the elevator hoistway 12 to relocate to a preset floor 30 in response to detecting a smoke condition. For example, one or more elevators may be recalled by redirecting the one or more elevators to either a primary or designated alternate level when a smoke detector associated with the one or more elevators activates. In another example, a heat detector associated with the one or more elevators may not cause the recall of the one or more elevators but may signal the fire alarm system to cause the activation of a control module or relay module to activate a shunt trip breaker to shut down the power to the one or more elevators.

In some embodiments, the integrated monitoring panel 20 is further configured to cause a disconnect of power to an elevator 14 in the elevator hoistway 12 in response to detecting at least one of a heat condition or a smoke condition.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspect. Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions and/or acts specified in the flowchart and/or block diagram block or blocks.

The functions and acts noted in the blocks may occur out of the order noted in the operational illustrations. For example, two blocks shown in succession may in fact be executed substantially concurrently or the blocks may sometimes be executed in the reverse order, depending upon the functionality and/or acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:

1. A system for detecting fire conditions in an elevator hoistway, the system comprising:

a smoke alarm detection piping, at least a portion of the smoke alarm detection piping being disposed within the elevator hoistway;

a linear heat detection cable, at least a portion of the linear heat detection cable being disposed within the elevator hoistway and affixed to at least a portion of the smoke alarm detection piping via a plurality of mounting clips;
an integrated monitoring panel disposed in an elevator machine room, the integrated monitoring panel comprising:
processing circuitry configured to trigger a test mode;
a power supply configured to supply power to at least the integrated monitoring panel;
a power supply fault indicator configured to monitor the power supply for a power supply fault;
a smoke detection fault indicator;
a smoke detection alert indicator;
a smoke detection alarm indicator;
a smoke detection test port in fluid communication with the smoke alarm detection piping, the smoke detection test port being configured to receive simulated smoke;
the smoke alarm detection piping comprising a first terminus connected to the smoke detection test port and a second terminus connected to the integrated monitoring panel;
a linear heat detection alarm indicator;
a linear heat detection test switch configured to trigger testing of the linear heat detection cable;
the linear heat detection cable comprising a first terminus in electrical communication with the linear heat detection switch and a second terminus connected to the integrated monitoring panel;
an exhaust port configured to discharge fluid in the smoke alarm detection piping;
the linear heat detection test switch being configured to apply an electrical condition to the first terminus of the linear heat detection cable based at least in part on the triggering of testing of the linear heat detection cable; and
the processing circuitry configured to:
during the test mode:
analyze an air quality condition at the second terminus of the smoke alarm detection piping based on a circulation of the simulated smoke through the smoke alarm detection piping from at least the first terminus of the smoke alarm detection piping to the second terminus of the smoke alarm detection piping;
cause at least one of the smoke detection fault indicator or the smoke detection alarm indicator to activate based at least in part on the air quality condition;
analyze an electrical state of the second terminus of the linear heat detection cable;
cause the linear heat detection alarm indicator to activate based at least in part on the electrical state; and
determine the system meets at least one operational criteria based on activation of:
at least one of the smoke detection fault indicator or the smoke detection alarm indicator; and
the linear heat detection alarm indicator.

2. An integrated monitoring panel for an elevator hoistway fire detection system, the integrated monitoring panel comprising:
processing circuitry configured to trigger a test mode;
a power supply configured to supply power to at least the integrated monitoring panel;
a power supply fault indicator configured to monitor the power supply for a power supply fault;
a smoke detection fault indicator;
a smoke detection alert indicator;
a smoke detection alarm indicator;
a smoke detection test port in fluid communication with a smoke alarm detection piping, the smoke detection test port being configured to receive simulated smoke, the smoke detection test port being further configured to receive a first terminus of a smoke alarm detection piping;
a linear heat detection alarm indicator;
a linear heat detection test switch configured to trigger testing of a linear heat detection cable, the linear heat detection switch being further configured to receive a first terminus of a linear heat detection switch;
the integrated monitoring panel being configured to receive a second terminus of the smoke alarm detection piping and a second terminus of the linear heat detection cable;
an exhaust port configured to discharge fluid in the smoke alarm detection piping;
the linear heat detection test switch being configured to apply an electrical condition to the first terminus of the linear heat detection cable based at least in part on the triggering of testing of the linear heat detection cable; and
the processing circuitry configured to:
during the test mode:
analyze an air quality condition at the second terminus of the smoke alarm detection piping based on a circulation of the simulated smoke through the smoke alarm detection piping from at least the first terminus of the smoke alarm detection piping to the second terminus of the smoke alarm detection piping;
cause at least one of the smoke detection fault indicator or the smoke detection alarm indicator to activate based at least in part on the air quality condition;
analyze an electrical state of the second terminus of the linear heat detection cable;
cause the linear heat detection alarm indicator to activate based at least in part on the electrical state; and
determine the system meets at least one operational criteria based on activation of:
at least one of the smoke detection fault indicator or the smoke detection alarm indicator; and
the linear heat detection alarm indicator.

3. The integrated monitoring panel of claim 2, wherein the processing circuitry is configured to receive at least one of heat detection information and smoke detection information from at least one sensor external to the integrated monitoring panel.

4. The integrated monitoring panel of claim 2, wherein the integrated monitoring panel is disposed within an elevator machine room.

5. The integrated monitoring panel of claim 4, wherein at least a portion of the smoke alarm detection piping is disposed within an elevator hoistway.

6. The integrated monitoring panel of claim 5, wherein the smoke alarm detection piping traverses a firestopped barrier between the elevator machine room and the elevator hoistway.

7. The integrated monitoring panel of claim 4, wherein at least a portion of the linear heat detection cable is disposed within an elevator hoistway.

8. The integrated monitoring panel of claim 7, wherein the linear heat detection cable traverses a firestopped barrier between the elevator machine room and the elevator hoistway.

9. The integrated monitoring panel of claim 2, wherein at least a portion of the linear heat detection cable is affixed to at least a portion of the smoke alarm detection piping via a plurality of mounting clips.

10. The integrated monitoring panel of claim 2, wherein the processing circuitry is further configured to trigger an elevator in the elevator hoistway to relocate to a preset floor in response to detecting a smoke condition.

11. The integrated monitoring panel of claim 2, wherein the processing circuitry is further configured to cause a disconnect of power to an elevator in the elevator hoistway in response to detecting at least one of a heat condition or a smoke condition.

12. A method in an integrated monitoring panel for an elevator hoistway fire detection system, the integrated monitoring panel comprising:

processing circuitry configured to trigger a test mode;

a power supply configured to supply power to at least the integrated monitoring panel;

a power supply fault indicator configured to monitor the power supply for a power supply fault;

a smoke detection fault indicator;

a smoke detection alert indicator;

a smoke detection alarm indicator;

a smoke detection test port in fluid communication with a smoke alarm detection piping, the smoke detection test port being configured to receive simulated smoke, the smoke detection test port being further configured to receive a first terminus of a smoke alarm detection piping;

a linear heat detection alarm indicator;

a linear heat detection test switch configured to trigger testing of a linear heat detection cable, the linear heat detection switch being further configured to receive a first terminus of a linear heat detection switch;

the integrated monitoring panel being configured to receive a second terminus of the smoke alarm detection piping and a second terminus of the linear heat detection cable;

an exhaust port configured to discharge fluid in the smoke alarm detection piping;

the linear heat detection test switch being configured to apply an electrical condition to the first terminus of the linear heat detection cable based at least in part on the triggering of testing of the linear heat detection cable; and the method comprising:

during the test mode:

analyzing an air quality condition at the second terminus of the smoke alarm detection piping based on a circulation of the simulated smoke through the smoke alarm detection piping from at least the first terminus of the smoke alarm detection piping to the second terminus of the smoke alarm detection piping;

causing at least one of the smoke detection fault indicator or the smoke detection alarm indicator to activate based at least in part on the air quality condition;

analyzing an electrical state of the second terminus of the linear heat detection cable;

causing the linear heat detection alarm indicator to activate based at least in part on the electrical state; and determining the system meets at least one operational criteria based on activation of:

at least one of the smoke detection fault indicator or the smoke detection alarm indicator; and the linear heat detection alarm indicator.

13. The method of claim 12, further comprising receiving at least one of heat detection information and smoke detection information from at least one sensor external to the integrated monitoring panel.

14. The method of claim 12, wherein the integrated monitoring panel is disposed within an elevator machine room.

15. The method of claim 14, wherein at least a portion of the smoke alarm detection piping is disposed within an elevator hoistway.

16. The method of claim 15, wherein the smoke alarm detection piping traverses a firestopped barrier between the elevator machine room and the elevator hoistway.

17. The method of claim 14, wherein at least a portion of the linear heat detection cable is disposed within an elevator hoistway.

18. The method of claim 17, wherein the linear heat detection cable traverses a firestopped barrier between the elevator machine room and the elevator hoistway.

19. The method of claim 12, wherein at least a portion of the linear heat detection cable is affixed to at least a portion of the smoke alarm detection piping via a plurality of mounting clips.

20. The method of claim 12, further comprising at least one of:

triggering an elevator in the elevator hoistway to relocate to a preset floor in response to detecting a smoke condition; or disconnecting power to the elevator in the elevator hoistway in response to detecting at least one of a heat condition or a smoke condition.

* * * * *